Figure 3:
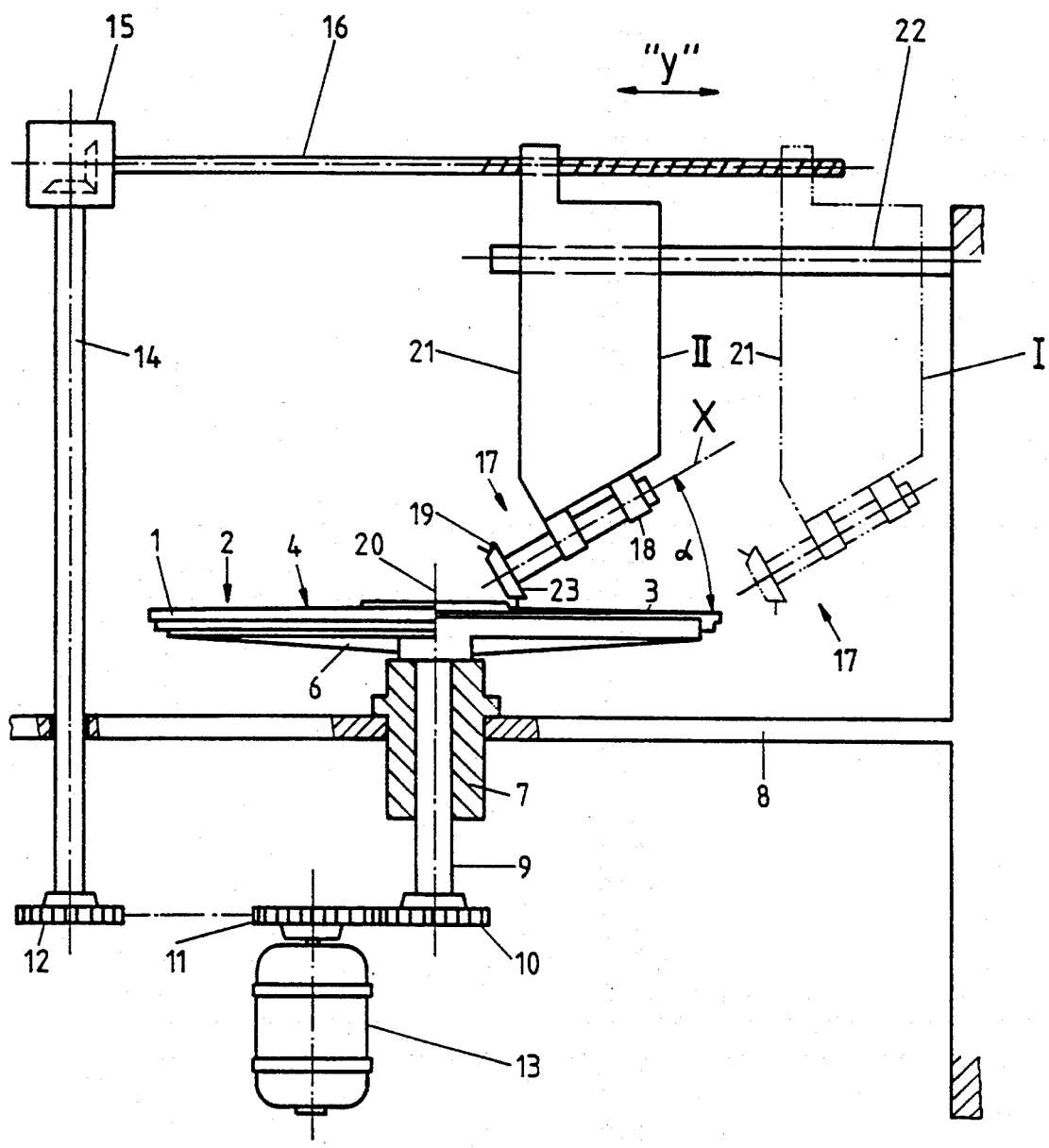

United States Patent [19]
Mueller

[11] Patent Number: 5,410,925
[45] Date of Patent: May 2, 1995

[54] METHOD OF MAKING AN AERATOR MEMBRANE

[75] Inventor: Konrad Mueller, Uster, Switzerland

[73] Assignee: Huber+Auhner AG, Pfaeffikon, Switzerland

[21] Appl. No.: 118,621

[22] Filed: Sep. 10, 1993

[30] Foreign Application Priority Data

Sep. 22, 1992 [DE] Germany ............... 42 31 696.0

[51] Int. Cl.⁶ .................................... B26F 1/24
[52] U.S. Cl. ............................ 83/30; 83/660; 83/733
[58] Field of Search ............... 83/30, 310, 660, 733

[56] References Cited

U.S. PATENT DOCUMENTS 677,257  6/1901  McDonnell .............. 83/660 X
3,811,352  5/1974  McFadden .............. 83/54
3,822,617  7/1974  Weichel .............. 83/733 X

FOREIGN PATENT DOCUMENTS 0174429  4/1985  European Pat. Off. .
3316140  11/1983  Germany .

Primary Examiner—Richard K. Seidel
Assistant Examiner—Raymond D. Woods
Attorney, Agent, or Firm—Shoemaker and Mattare, Ltd.

[57] ABSTRACT

The aeration field of an aerator membrane is formed by perforating the membrane with a rotary device having a plurality of perforating tools. The membrane also rotates while it is being perforated, and the membrane and tool simultaneously move in a radial direction, with respect to the membrane, so that a spiral line of perforations results.

6 Claims, 3 Drawing Sheets

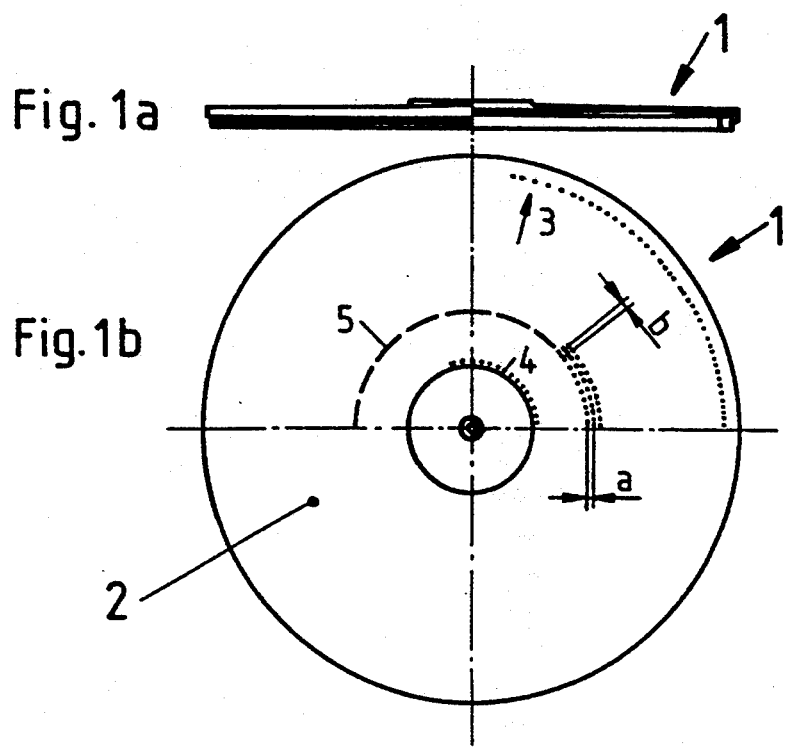
Fig. 1a
Fig. 1b
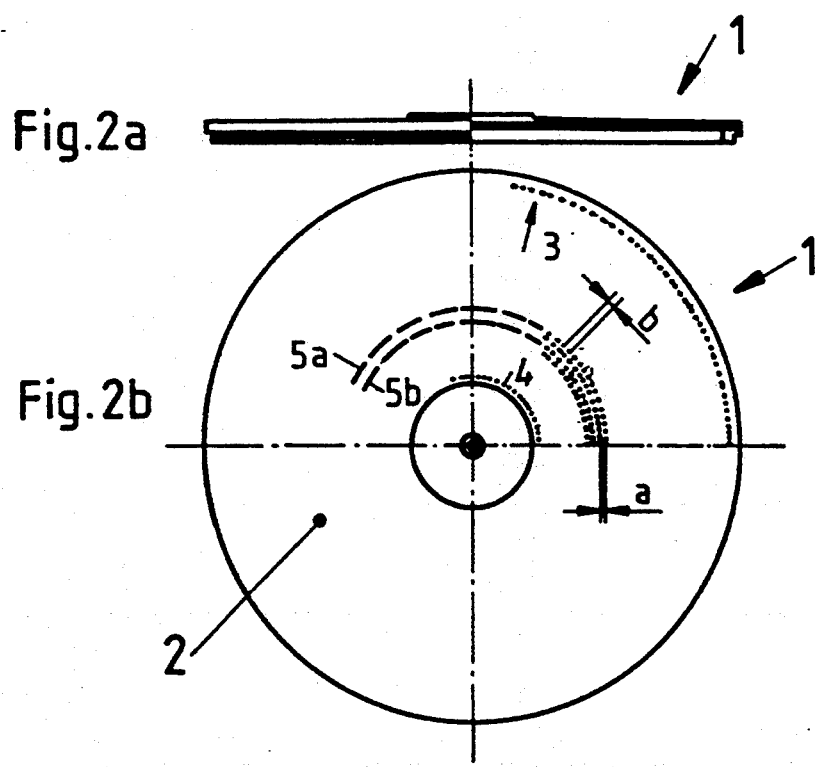
Fig. 2a
Fig. 2b

METHOD OF MAKING AN AERATOR MEMBRANE

The invention concerns a method of perforating a membrane for a surface type aerator made from an elastic material with an approximately disc shaped aeration field as well as a device for generating an aeration field in a surface type aerator. Surface type aerators for fine bubbled aeration of water, in particular sewage and waste water, are known in the most varied of versions, and are in use. As a rule, air under pressure is blown in between a disc shaped support element and a membrane, provided with small openings, stretched over it. The membrane is under tension and the pressure air passes through the openings or pores of the membrane in numerous small bubbles and out into the liquid above. With the surface type aerator for waste water or sewage according to DE-PS-3316140, an elastic aerator membrane is suggested which, after switching off the compressed air source, should rest upon the support element in such a way that a sealing effect takes effect through the pressure of the waste water. Through this, entry of waste water or sewage into the compressed air piping should be avoided. With the surface type aerator according to EP-PS- 174 429, the use of a membrane is suggested, the openings or pores of which close elastically after switching off the compressed air source. With that, entry of waste water or sewage into the pressure piping should also be avoided.

It has been shown in practice that the manufacture of the aeration openings in the membrane is accompanied by difficulties. Relatively high requirements are placed upon these openings: they shall be formed as uniformly as possible in order to ensure uniform passing of gas and uniform opening, respectively closing conditions. Apart from that, it is desirable that they are arranged at a relatively small distance from one another, in order to achieve a bubble pattern which is as homogeneous as possible. On the other hand, difficulties in meeting these requirements arise with current methods. A complicated tool construction results, for example when creating such openings during manufacture (e.g. when forming in a tool) which demands a relatively large spacing between the aeration openings. Also when punching the holes with numerous punches arranged parallel to one another, a complicated method of manufacture will result which on the one hand requires pressing with a high closing pressure and on the other hand causes distortion of the membrane through the parallel engagement of the punches during the punching procedure, which can result in an irregular formation of holes. Apart from that, relatively large hole spacing results. These problems arise with practically all materials currently used, especially with membranes or foils made of plastic, rubber (e.g. EPDM Ethylene/Propylene/-Copolymer, Ethylene/Propylene/Terpolymer) or other flexible and/or elastic materials.

It is the purpose of the invention to avoid the disadvantages of the known methods and devices, in particular therefore to create a method and a device for manufacture of a membrane for a surface type aerator which will permit simple and economical creation of openings of a controllable, uniform size and shape as well as, in practice, any desired spacing density, for the passing of gas through the membranes of surface type aerators.

According to the invention, this purpose is primarily solved according to the characteristics of the independent patent claims.

Through employment of perforating devices with a plurality of perforating tools which are applied in sequence to the membrane, mainly high density and rapid working speeds will be ensured without having to accept the disadvantage of tools working parallel to each other, (mainly deformation of the membrane, high pressure and large hole spacing).

The arrangement of spiral shaped lines of perforations results not only in a possibility for continuous processing, but also the possibility to aim at a very close spacing of holes through employment of a small spiral pitch. This mainly applies if the perforating tools, in a single row, are brought into engagement with the membrane in sequence, that means therefore that they are for example arranged radially on a disc shaped perforating device which is rolled in a spiral pattern over the membrane.

Obviously, it is however also possible to arrange for example two or three of these types of rows of perforating tools adjacently, in order to simultaneously apply adjacent perforations. This will in practice be confined to a few rows, mainly when close spacing of holes is desired.

In practice, such membranes have proven themselves particularly if they are perforated in lines with a hole spacing of more than 1,5 and less than 4,5 mm. Hole spacings of between 2 and 3 mm are particularly advantageous. These spacings can be mastered with regard to the method and the device on the one hand, and result on the other hand in a particularly uniform and dense formation of bubbles on the surface of the membrane.

In this respect, perforating tools with an outer diameter of 40 mm to 90 mm have proved themselves. Mainly with perforating of membranes made from EPDM with a thickness of 1,5 mm–4 mm, perforation needles with a diameter of 1,0 mm–1,5 mm have proved themselves to be particularly satisfactory.

With regard to the device, the perforating device can be realised in a particulary simple way, and high perforation speeds are possible, if the perforating device, on which a plurality of perforating tools is fixed, is a disc rotating about its central axis, the disc axis running at an acute angle in relation to the plane of the membrane and the longitudinal axis of the perforating tools being inclined in relation to the rotational axis of the disc in such a way that the individual perforating tools, through rotating of the disc, are able in sequence to be brought into a position running approximately vertical to the plane of the membrane surface. For creation of a spiral line of perforations, at least one drive device is provided for creation of relative motion between the perforating device and the surface of the membrane.

The drive device can be realised in a simple way if it possesses a rotary table for the membrane and at least one radial feed device for displacement of the perforating device approximately along a radius line of the rotary table.

Metal needles are particulary suitable as perforating tools. It can also be advantageous, for adaptation to the flow conditions or changing of the opening behaviour of the holes, if the needles are ground to be blade or lancet or star shaped.

Figure 4:
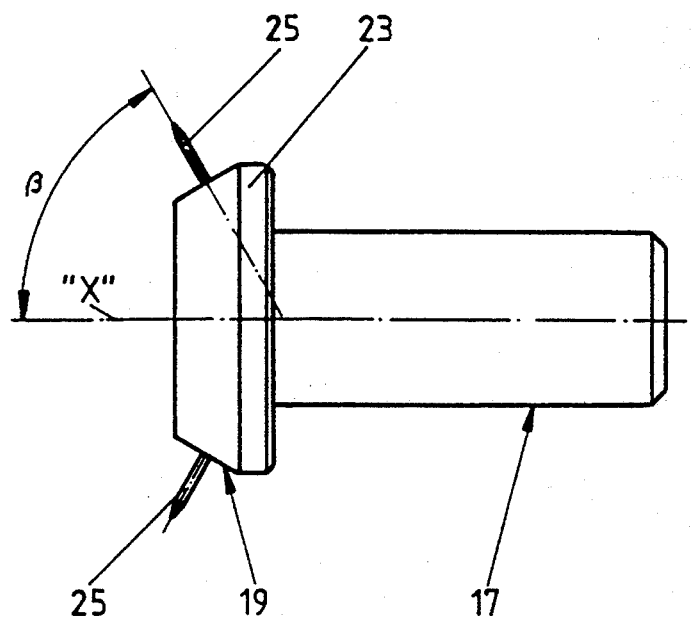
Figure 5:
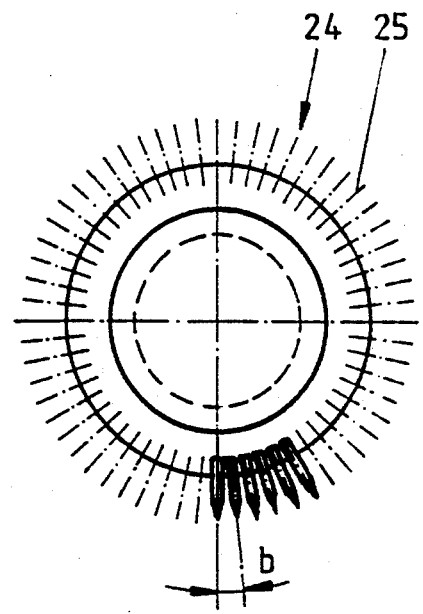
Figure 6:
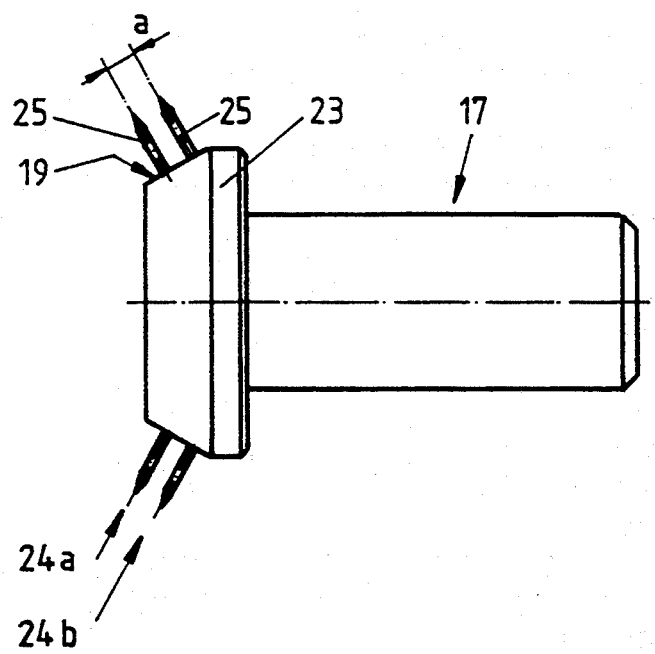

The invention is more closely described in the following embodiments in accordance with the drawings. Namely:

FIG. 1a and 1b a schematic representation of a membrane for a surface type aerator in a side view and a plan view, FIG. 2a and 2b a membrane for a surface type aerator with modified perforations, FIG. 3 a schematic representation of a device for generating an aeration field in a surface type aerator membrane, FIG. 4 a side view of a perforating device with the features of the invention, FIG. 5 a front view of the perforating device according to FIG. 4, and FIG. 6 a modified embodiment of a perforating device according to FIG. 4.

According to FIG. 1, a disc shaped membrane 1 for a surface type aerator possesses an aeration field confined by an outer line of holes 3 and an inner line of holes 4. The individual holes run in an uninterrupted spiral shaped line 5, as schematically suggested in FIG. 1b.

The spacing a between adjacent lines, as well as the spacing b between successive holes or perforations, amounts to 2.5 mm, the membrane 1 being provided with a total of approximately 30,000 individual holes.

The embodiment according to 2a and 2b has two spiral lines of holes 5a and 5b running parallel to one another, which run continuously, with a spiral shape, from the outer line of holes 3 to the inner line of holes 4. The spacing between both lines of holes 5a and 5b, as well as the spacing between the next following lines a, as well as the spacing b from in each case two successive openings amounts to 2 mm, uniformly distributed over the whole aeration field 2. The total number of openings or perforations amounts to approximately 20,000. According to the type of application and size of the membranes, the hole spacing and number of perforations can vary.

FIG. 3 shows a device for creating the aeration field 2 (FIGS. 1 and 2) in the membrane 1, which is stretched for working on a rotary table 6. The rotary table 6 is held on a frame 8 in a bearing device 7. A drive axis 9 is provided, connected to a drive motor 13 by gearwheels 10 and 11, for the drive of the rotary table 6. The drive motor 13 is in addition connected with a perforating device 17, via the gearwheel 11, a transmission coupling not shown here, the gearwheel 12, the drive shaft 14, a transmission 15 and a schematically shown feed spindle 16.

The drive coupling between the drive motor 13 and the rotary table 6 on the one hand, respectively the perforating device 17 on the other hand, is here not positively sychronised. It must be understood from this that the perforating device 17 which is able to rotate in the arrangement of bearings 18 will be rotated freely about its axis X, that the surface 19 of the perforating device 17 can roll without slippage on the rotating membrane, independently from the distance that the surface 19 of the perforating device 17 is located from the centre 20. This is achieved through the needles 15 puncturing the membrane and imparting rotational motion on to the head 23 of the perforating device during rotation of the rotary table 6. The perforating device 17 is held in a holder 21 which is able to be displaced in the direction of the arrow Y linearly from a start position II into a final position I, i.e. radially outwards. The holder 21 is in addition held in a linear guide 22.

The perforating device 17 possesses a disc shaped head 23, running to a cone and forming the surface 19. A circularly arranged row 24 of needles 25 is affixed to this surface (FIGS. 4 and 5). The needles 25 are arranged at an acute angle $\beta$, inclined to the axis X of the perforating device 17 and the perforating device 17 is, in turn, arranged at an acute angle to be inclined in relation to the surface of the membrane 1. Both the angles $\alpha$ and $\beta$ are here dimensioned in such a way that the needles are able to be brought in each case into a vertical position in relation to the membrane 1—indeed at that moment when they penetrate into the membrane most deeply.

In the operating sequence for creation of an aeration field 2 in the membrane, first of all the perforating device is brought, with the aid of the linear guide 22, into the area of the inner line of holes 4 of the membrane 1, and is there pressed against the membrane 1 in such a way that the row of needles 25 directed toward the membrane 1 pass through the membrane 1. With that, the head 23 and rotary table 6 rotate with the previously described synchronisation so that the surface 19 with the row of needles 24 rolls on the rotary table 6, respectively on the membrane 1, thereby creating a line of holes. Simultaneously, the linear guide will be driven so that the line of holes will be formed spirally in towards the centre 20 of the membrane 1.

Through presetting of the feed speed of the linear guide 22, the pitch of the spiral of holes thus created can be influenced, obviously with consideration of the rotational speed of the rotary table 6. The spacing of the individual holes in the membrane 1 can be achieved through using different heads 23 with differing spacing between the needles 25.

FIG. 6 shows a modified head 23 with two parallel, adjacent rows 24a, 24b of needles 25, with which a double spiral of hole lines 5a, 5b (FIG. 2b) can be created.

Inasmuch as the invention is subject to modifications and variations, the foregoing description and accompanying drawings should not be regarded as limiting the invention, which is defined by the following claims and various combinations thereof:

I claim:

1. A method of manufacturing a membrane for a surface type aerator with an approximately disc shaped aeration field made from a flexible membrane, said method comprising a step of
displacing a rotating perforating device with a plurality of perforating tools over a surface of the membrane along at least one spirally shaped path, relative to the membrane, to form a series of perforations in the membrane.

2. A method according to claim 1, wherein with each rotation of the perforating device, a plurality of the perforations is created in a least one line.

3. A method according to claim 1, wherein the perforating device has an approximately conical surface on which the plurality of perforating tools is arranged approximately annularly, and the perforating device is rotated about its conical axis, so that its conical surface is rolled upon the membrane while the membrane rotates about its center point and the perforating device and the membrane are simultaneously moved relative to one another along a line aligned approximately radially to the center point of the membrane, in such a way that a spirally shaped rolling path of the conical surface on the membrane results.

4. A method according to claim 1, wherein the membrane is punctured spirally by the perforating tools from an inner line of holes outwards in the direction of an outer line of holes.

5. A method according to claim 1, wherein the membrane is punctured along at least two spiral lines.

6. A method according to claim 1, wherein the membrane is punctured in lines with a hole spacing of more than 1.5 mm and less than 4 mm.

* * * * *

UNITED STATES PATENT AND TRADEMARK OFFICE
CERTIFICATE OF CORRECTION

PATENT NO. : 5,410,925
DATED : May 2, 1995
INVENTOR(S) : Konrad MUELLER

It is certified that error appears in the above-identified patent and that said Letters Patent is hereby corrected as shown below:

Title page, item [73], change "HUBER + AUHNER AG" to --HUBER & SUHNER AG--.

Signed and Sealed this

Fifth Day of September, 1995

*Attest:*

BRUCE LEHMAN

*Attesting Officer*  *Commissioner of Patents and Trademarks*